United States Patent [19]

Ikemure

[11] Patent Number: 5,502,777
[45] Date of Patent: Mar. 26, 1996

[54] METHOD AND APPARATUS FOR RECOGNIZING TABLE AND FIGURE HAVING MANY LATERAL AND LONGITUDINAL LINES

[75] Inventor: Yumiko Ikemure, Fukuoka, Japan

[73] Assignee: Matsushita Electric Industrial Co., Ltd., Osaka, Japan

[21] Appl. No.: 245,261

[22] Filed: May 18, 1994

[30] Foreign Application Priority Data

Jun. 30, 1993  [JP]  Japan .................................. 5-162109

[51] Int. Cl.$^6$ .................................................... G06K 9/34
[52] U.S. Cl. ........................... 382/173; 382/183; 382/190
[58] Field of Search .................................... 382/9, 10, 11, 382/14, 12, 13, 16, 56, 48, 61; 348/472, 415

[56] References Cited

U.S. PATENT DOCUMENTS

| | | | |
|---|---|---|---|
| 4,750,209 | 6/1988 | Shimura et al. | 382/9 |
| 5,136,658 | 8/1992 | Mori | 382/1 |
| 5,144,682 | 9/1992 | Nakamura | 382/9 |
| 5,195,147 | 3/1993 | Ohta | 382/9 |
| 5,228,100 | 7/1993 | Takeda et al. | 382/48 |
| 5,235,653 | 8/1993 | Nakano et al. | 382/61 |

Primary Examiner—Leo Boudreau
Assistant Examiner—Anh Hong Do
Attorney, Agent, or Firm—Lowe, Price, LeBlanc & Becker

[57] ABSTRACT

There is disclosed method and apparatus for recognizing a table and a figure drawn in a recognized document even though there are many intersections formed on each of lateral and longitudinal lines drawn in the figure. Figures and tables drawn in the recognized are read, and circumscribed rectangles circumscribed about the figures and the tables are detected. A circumscribed rectangle in which a larger value between the number of lateral lines and the number of longitudinal lines is not higher than a prescribed value or a maximum value among intersection numbers which each correspond to the number of intersections formed on one of the lateral and longitudinal lines is not higher than a prescribed value is extracted as a circumscribed figure-rectangle circumscribed about one of the figures. A circumscribed rectangle in which a ratio of the number $N_{P1}$ of black pixels composing lateral lines and longitudinal lines to the number $N_{P2}$ of black pixels combined with each other is not higher than a prescribed value is extracted as another circumscribed figure-rectangle circumscribed about one of the figures. A circumscribed rectangle in which the ratio is higher than the prescribed value is extracted as a circumscribed table-rectangle circumscribed about one of the tables.

10 Claims, 6 Drawing Sheets

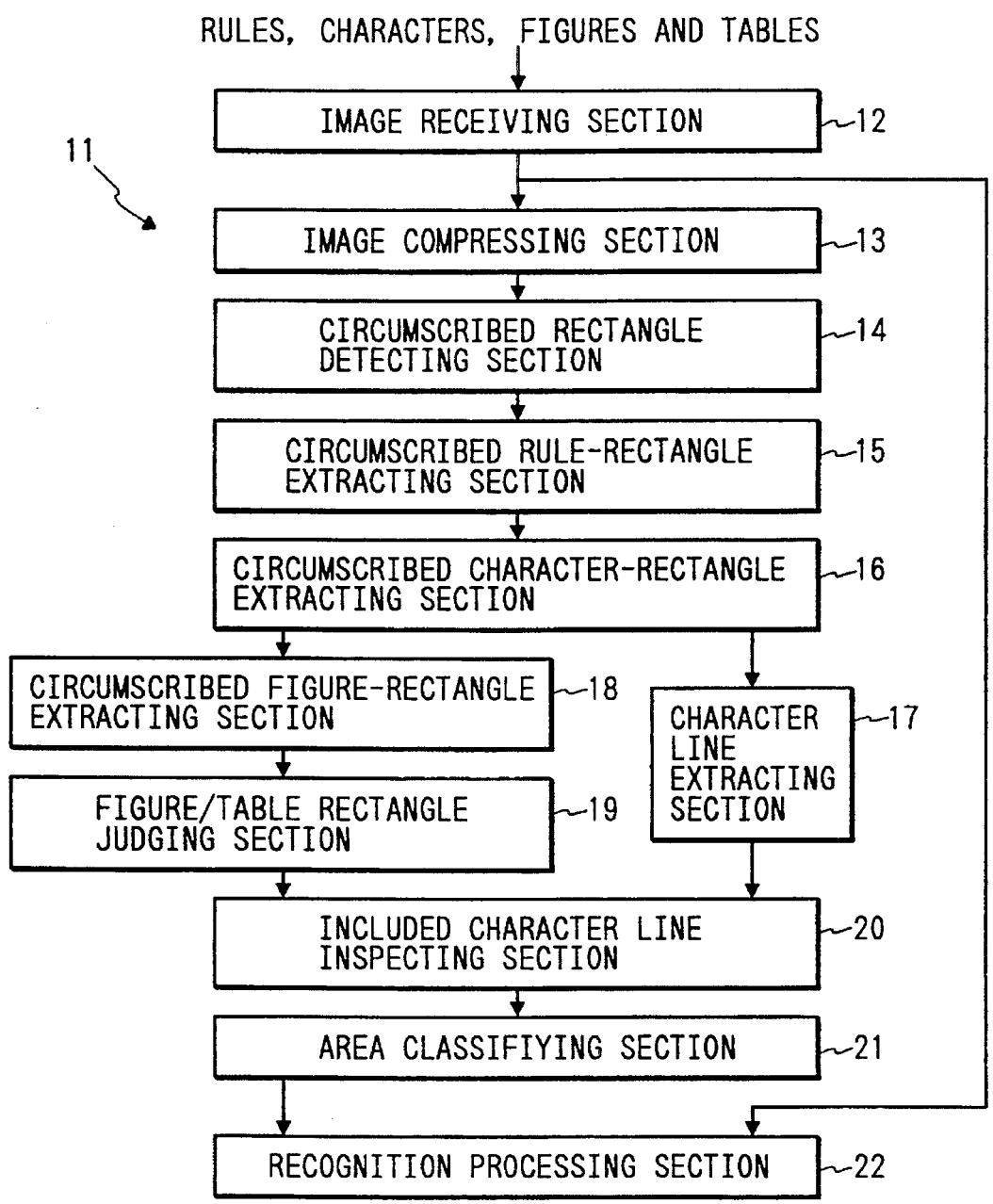

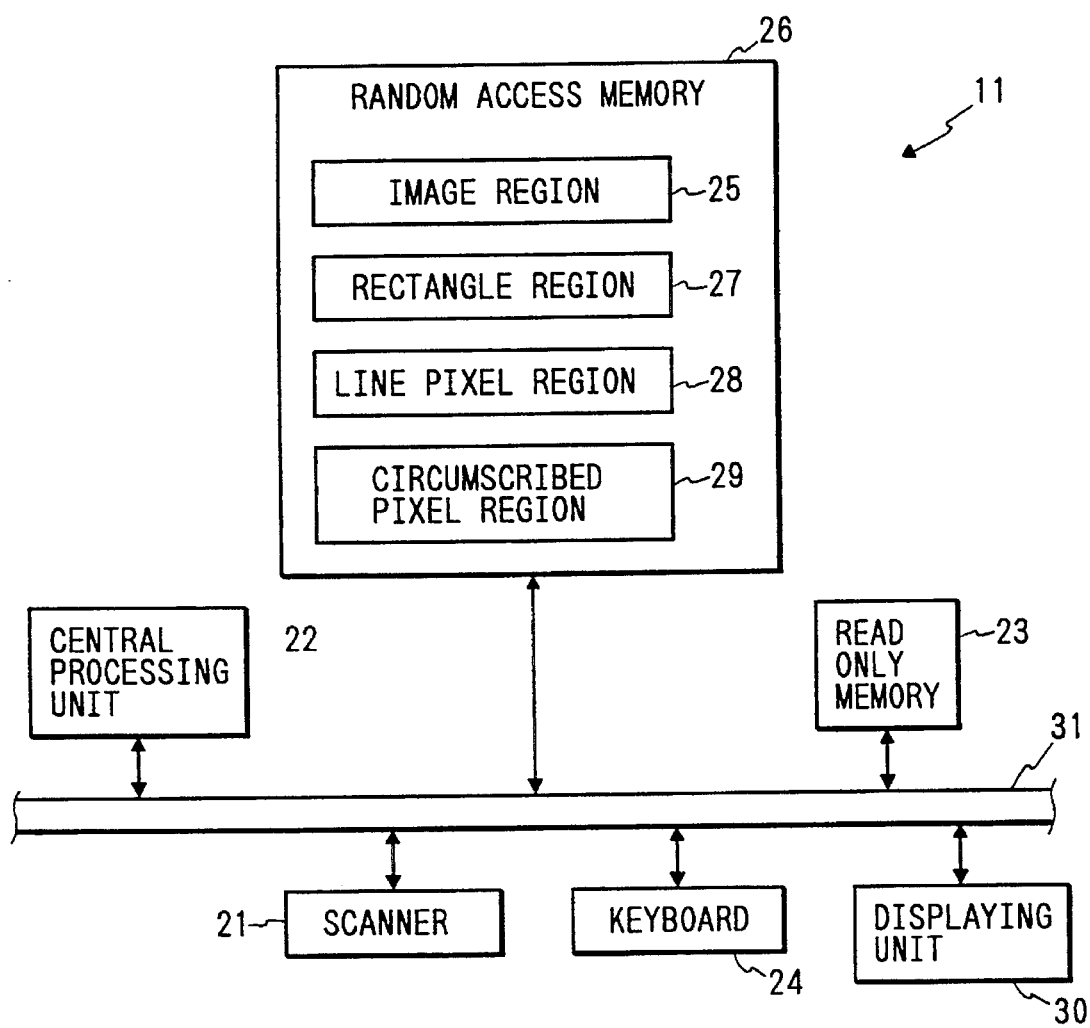

|  | ITEM 1 | ITEM 2 |
|---|---|---|
| ARTICLE 1 | ABC | DEF |
| ARTICLE 2 | GHI | JKL |

FIG. 5
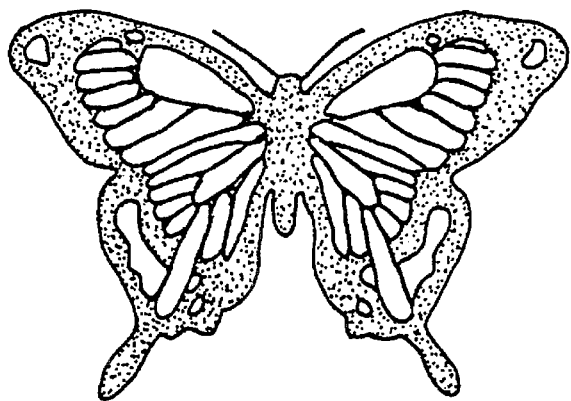
FIG. 6
CIRCUMSCRIBED FIGURE-RECTANGLE
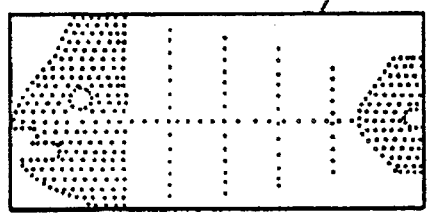
C1
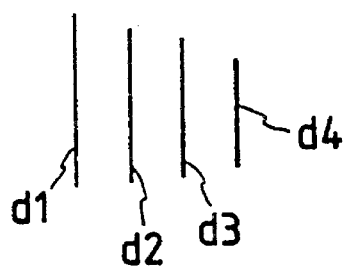

METHOD AND APPARATUS FOR RECOGNIZING TABLE AND FIGURE HAVING MANY LATERAL AND LONGITUDINAL LINES

BACKGROUND OF THE INVENTION

1. Field of the Invention

The present invention relates to recognition method and apparatus in which various types of recognition processes are performed according to attributes provided for areas of characters, areas of tables, areas of figures and areas of rules automatically extracted from a printed document or a hand-written document in which the characters, the tables, the figures having many lateral and longitudinal lines, and the rules are drawn.

2. Description of the Related Art

Electronic documents have been recently utilized to improve a document referring operation and minimize a document storing space. To store a printed document or a hand-written document in a memory of a computer with an input device, various types of table and figure recognition methods have been developed in which a character such as a Chinese character, a letter, or the like, a table and a figure are directly converted into pieces of electronic data without any other process.

2.1. Previously Proposed Art

In a conventional table and figure recognition method, characters, tables, figures and rules drawn in a recognized document such as a printed document or a hand-written document are initially read with an input device of a computer such as a scanner and are converted into binary-valued images of the characters, the tables, the figures and the rules. The binary-valued images are stored in a memory of the computer. Thereafter, tile binary-valued images are compressed to degrade the resolution of the binary-valued images to about a 100 dots per inch (dpi), and pieces of compressed binary-valued image data respectively corresponding to a pixel are output. Therefore, the extraction time required to perform an area extraction process can be shortened. Thereafter, combined black pixel portions which each are composed of a plurality of black pixels adjacent to each other in a lateral direction, a longitudinal direction or a diagonal direction of the recognized document to form a combined group are detected. A rectangle circumscribed about each of the combined black pixel portions is called a circumscribed rectangle. Thereafter, pieces of positional information and pieces of size information of the circumscribed rectangles corresponding to the combined black pixel portions are stored.

Thereafter, a length ratio of a longitudinal side to a lateral side in each of the circumscribed rectangles is calculated, and one or more circumscribed rectangles in which the ratios are respectively larger than a prescribed value are selected as one or more circumscribed rule-rectangles from among the circumscribed rectangles. Each of the circumscribed rule-rectangles is judged to be circumscribed about a rule. Thereafter, a rule attribute is set to each of the circumscribed rule-rectangles.

Thereafter, a length of a longitudinal side and another length of a lateral side are compared with each other for each of remaining circumscribed rectangles not selected as the circumscribed rule-rectangles, and a shorter length between the lengths is selected. Thereafter, one or more circumscribed rectangles in which tile shorter lengths are respectively smaller than a prescribed value are selected as one or more circumscribed character-rectangles from among the remaining circumscribed rectangles. Each of the circumscribed character-rectangles is judged to be circumscribed about a character. Thereafter, a character attribute is set to each of the circumscribed character-rectangles. Thereafter, a direction of the circumscribed character-rectangles placed in a line is determined according to the positional information of the circumscribed character-rectangles, so that character lines are extracted.

Thereafter, one or more lateral lines and one or more longitudinal lines existed in each of remaining circumscribed rectangles not selected as the circumscribed rule-rectangles or the circumscribed character-rectangles are extracted. Each of the lateral lines is composed of a series of black pixels adjacent to each other in the lateral direction, and each of the longitudinal lines is composed of a series of black pixels adjacent to each other in the longitudinal direction. Thereafter, the number of lateral lines, the number of longitudinal lines intersection numbers which each correspond to the number of intersections formed on each of the lateral and longitudinal lines are counted for each of the remaining circumscribed rectangles. In cases where the number of lateral lines or the number of longitudinal lines in a circumscribed rectangle is larger than a prescribed value on condition that one of the intersection numbers in the circumscribed rectangle is larger than another prescribed value, the circumscribed rectangles is judged as a circumscribed table-rectangle circumscribed about a table. Thereafter, a table attribute is set to each of the circumscribed table-rectangles.

Thereafter, one or more remaining circumscribed rectangles not selected as the circumscribed rule-rectangles, the circumscribed character-rectangles or the circumscribed table-rectangles are judged as one or more circumscribed figure-rectangle circumscribed about a figure. Thereafter, a figure attribute is set to each of the circumscribed figure-rectangles.

Thereafter, rule areas occupied by the circumscribed rule-rectangles, character areas occupied by the circumscribed character-rectangles, table areas occupied by the circumscribed table-rectangles and figure areas occupied by the circumscribed figure-rectangles are extracted according to the area extraction process. Thereafter, various types of recognition processes are performed for the rule areas, the character areas, the table areas and the figure areas according to the attributes set to the circumscribed rule-rectangles, the circumscribed character-rectangles, the circumscribed table-rectangles and the circumscribed figure-rectangles, so that the recognition of the rules, the characters, the tables and the figures drawn in the printed document or the hand-written document is performed.

2.2. Problems to be Solved by the Invention

However, in the conventional table and figure recognition method, in cases where it is judged whether a circumscribed rectangle is regarded as a circumscribed table-rectangle or a circumscribed figure-rectangle, the judgement merely depends on the number of lateral lines existing in the circumscribed rectangle, tile number of longitudinal lines existing in the circumscribed rectangle, tile intersection numbers which each correspond to the number of intersections formed on one of the lateral and longitudinal lines. Therefore, in cases where a figure in which many intersections formed on each of the lateral and longitudinal lines exist is drawn in a recognized document a circumscribed rectangle circumscribed about the figure is erroneously judged as a circumscribed table-rectangle. That is, there is a drawback that the recognition processes cannot be reliably performed because the figure cannot be correctly distinguished from a table.

SUMMARY OF THE INVENTION

An object of the present invention is to provide, with due consideration to the drawbacks of such a conventional recognition method, a table and figure recognition method in which a figure drawn in a recognized document is distinguished from a table to correctly recognize the figure and the table even though many intersections formed on each of the lateral and longitudinal lines exist in the figure. Also, the object is to provide a table and figure recognition apparatus in which various types of recognition processes are reliably performed according to the table and figure recognition method.

The object is achieved by the provision of a table and figure recognition method, comprising the step of:

reading a table or a figure drawn in a recognized document;

producing a binary-valued image of tile table or the figure, the binary-valued image being formed of a group of black pixels;

detecting a rectangle circumscribed about the group of black pixels designating the binary-valued image of the table or the figure as a circumscribed rectangle;

extracting one or more lateral lines respectively composed of a plurality of black pixels which are placed in an inside area of the circumscribed rectangle and are adjacent to each other in a lateral direction of the recognized document;

extracting one or more longitudinal lines respectively composed of a plurality of black pixels which are placed in the inside area of the circumscribed rectangle and are adjacent to each other in a longitudinal direction of the recognized document;

counting the number $N_{P1}$ of black pixels composing the lateral lines and the longitudinal lines extracted;

counting the number $N_{P2}$ of black pixels which are placed in the inside area of the circumscribed rectangle and are adjacent to each other in the lateral direction, the longitudinal direction or a diagonal direction of the recognized document;

calculating a ratio of the number $N_{P1}$ to the number $N_{P2}$ counted;

recognizing the table or the figure drawn in the recognized document as the table in cases where the ratio calculated is higher than a prescribed value; and recognizing the table or the figure drawn in the recognized document as the figure in cases where the ratio calculated is not higher than the prescribed value.

In the above steps, a figure drawn in a recognized document is often composed of not only a plurality of curved lines and a plurality of inclined lines but also many lateral and longitudinal lines. Also, a table drawn in the recognized document is almost composed of a plurality of lateral and longitudinal lines. Therefore, in cases where whether a recorded object drawn in a recognized document is a figure or a table is judged by considering the number of lateral lines composing the recorded object, the number of longitudinal lines composing the recorded object, the number of intersections of each lateral line and the longitudinal lines and the number of intersections of the lateral lines and each longitudinal line, there is a high probability that the judgement is erroneously performed.

In the present invention, the number $N_{P1}$ of black pixels composing the lateral lines and the longitudinal lines is counted. Also, the number $N_{P2}$ of black pixels which are placed in the inside area of the circumscribed rectangle and are adjacent to each other in the lateral direction, the longitudinal direction or the diagonal direction is counted. In cases where the recorded object drawn in the recognized document is a table, the number $N_{P1}$ is almost equal to the number $N_{P2}$. In contrast, in cases where the recorded object drawn in the recognized document is a figure, the number $N_{P1}$ is considerably lower than the number $N_{P2}$. Therefore, in cases where the judgement whether the recorded object drawn in the recognized document is a figure or a table is performed by considering the ratio of the number $N_{P1}$ to the number $N_{P2}$, the judgement can be correctly performed.

Accordingly, even though a figure composed of many lateral and longitudinal lines is read from the recognized document, the figure can be correctly distinguished from a table.

The object is also achieved by the provision of a table and figure recognition apparatus, comprising:

image receiving means for reading a table or a figure drawn in a recognized document to produce a binary-valued image of the table or the figure, the binary-valued image being formed of a group of black pixels;

circumscribed rectangle detecting means for detecting a rectangle circumscribed about the group of black pixels designating the binary-valued image of the table or the figure read by the image receiving means as a circumscribed rectangle;

lateral and longitudinal line extracting means for extracting one or more lateral lines respectively composed of a plurality of black pixels which are placed in an inside area of the circumscribed rectangle detected by the circumscribed rectangle detecting means and are adjacent to each other in a lateral direction of the recognized document and extracting one or more longitudinal lines respectively composed of a plurality of black pixels which are placed in the inside area of the circumscribed rectangle detected by the circumscribed rectangle detecting means and are adjacent to each other in a longitudinal direction of the recognized document; and figure/table rectangle judging means for counting the number $N_{P1}$ of black pixels composing the lateral lines and the longitudinal lines extracted by the lateral and longitudinal line extracting means, counting the number $N_{P2}$ of black pixels which are placed in the inside area of the circumscribed rectangle detected by the circumscribed rectangle detecting means and are adjacent to each other in the lateral direction, the longitudinal direction or a diagonal direction of the recognized document, calculating a ratio of the number $N_{P1}$ to the number $N_{P2}$, recognizing the table or the figure drawn in the recognized document as the table in cases where the ratio is higher than a prescribed value, and recognizing the table or the figure drawn in the recognized document as the figure in cases where the ratio is not higher than the prescribed value.

In the above configuration, a table or a figure drawn in a recognized document is read, and a binary-valued image of the table or the figure is produced in the image receiving means. The binary-valued image is formed of a group of black pixels. Thereafter, a rectangle circumscribed about the group of black pixels designating the table or the figure is detected in the circumscribed rectangle detecting means. The rectangle is called a circumscribed rectangle. Thereafter, one or more lateral lines and one or more longitudinal lines respectively composed of a plurality of black pixels which are placed in an inside area of tile circumscribed rectangle and are adjacent to each other in a lateral direction or a longitudinal direction are extracted in the lateral and longitudinal line extracting means.

Generally, a figure drawn in a recognized document is often composed of not only a plurality of curved lines and a plurality of inclined lines but also many lateral and longitudinal lines. Also, a table drawn in the recognized document is almost composed of a plurality of lateral and longitudinal lines. Therefore, in cases where whether a recorded object drawn in a recognized document is a figure or a table is judged by considering the number of lateral lines composing the recorded object, the number of longitudinal lines composing the recorded object, the number of intersections of each lateral line and the longitudinal lines and the number of intersections of the lateral lines and each longitudinal line, there is a high probability that the judgement is erroneously performed.

To avoid the above drawback, in the figure/table rectangle judging means, the number $N_{P1}$ of black pixels composing the lateral lines and the longitudinal lines is counted, and the number $N_{P2}$ of black pixels which are placed in the inside area of the circumscribed rectangle and are adjacent to each other in the lateral direction, the longitudinal direction or a diagonal direction of the recognized document are counted. Thereafter, whether the recorded object drawn in a recognized document is a figure or a table is judged according to a ratio of the number $N_{P1}$ to the number $N_{P2}$. That is, the recorded object is recognized as the table in cases where the ratio is higher than a prescribed value, and the recorded object is recognized as the figure in cases where the ratio is not higher than the prescribed value.

Accordingly, even though a figure composed of many lateral and longitudinal lines is read from the recognized document, tile figure can be correctly distinguished from a table.

The object is also achieved by the provision of a table and figure recognition apparatus, comprising:

image receiving means for reading one or more tables, one or more figures, one or more rules and one or more characters drawn in a recognized document to produce a plurality of binary-valued images of the tables, the figures, the rules and the characters, each of the binary-valued images being formed of a group of black pixels;

circumscribed rectangle detecting means for detecting a plurality of rectangles respectively circumscribed about the group of black pixels designating the binary-valued image of the table, the figure, the rule or the character read by the image receiving means as a plurality of circumscribed rectangles;

circumscribed rule-rectangle extracting means for calculating a length ratio of a lateral side to a longitudinal side in each of the circumscribed rectangles detected in the circumscribed rectangle detecting means and extracting one ore more circumscribed rectangle in which the length ratios are higher than a prescribed value as one ore more circumscribed rule-rectangle from the circumscribed rectangles;

circumscribed character-rectangle extracting means for calculating a shorter length between lengths of lateral and longitudinal sides in each of remaining circumscribed rectangles not extracted in the circumscribed rule-rectangle extracting means and extracting one ore more circumscribed rectangles in which the shorter lengths are lower than a prescribed value as one ore more circumscribed character-rectangles from the remaining circumscribed rectangles;

circumscribed figure-rectangle extracting means for extracting one or more lateral lines respectively composed of a plurality of black pixels which are placed in an inside area of each of remaining circumscribed rectangles not extracted in the circumscribed character-rectangle extracting means or the circumscribed rule-rectangle extracting means and are adjacent to each other in a lateral direction of the recognized document, extracting one or more longitudinal lines respectively composed of a plurality of black pixels which are placed in the inside area of each of the remaining circumscribed rectangle and are adjacent to each other in a longitudinal direction of the recognized document, calculating a maximum value among intersection numbers which each correspond to the number of intersections formed on each of the lateral and longitudinal lines, judging whether or not the maximum value is higher than a prescribed intersection value on condition that a higher value between the number of lateral lines and the number of longitudinal lines is higher than a prescribed line value, and recognizing the table or the figure drawn in the recognized document as the figure in cases where the maximum value is not higher than the prescribed intersection value or the higher value is not higher than the prescribed line value;

figure/table rectangle judging means for counting the number $N_{P1}$ of black pixels composing tile lateral lines and the longitudinal lines extracted in tile circumscribed figure-rectangle extracting means for each of remaining circumscribed rectangles not extracted in the circumscribed figure-rectangle extracting means, the circumscribed character-rectangle extracting means or the circumscribed rule-rectangle extracting means, counting the number $N_{P2}$ of black pixels which are placed in the inside area of each of the remaining circumscribed rectangles and are adjacent to each other in the lateral direction, the longitudinal direction or a diagonal direction of the recognized document, calculating a ratio of the number $N_{P1}$ to the number $N_{P2}$, recognizing the table or the figure drawn in the recognized document as the table in cases where the ratio is higher than a prescribed value, and recognizing the table or the figure drawn in the recognized document as the figure in cases where the ratio is not higher than the prescribed value;

area classifying means for classifying areas of the circumscribed rule-rectangles extracted in the circumscribed rule-rectangle extracting means as rule areas, classifying areas of the circumscribed character-rectangles extracted in the circumscribed character-rectangle extracting means as character areas, classifying areas of the circumscribed figure-rectangles extracted in the circumscribed figure-rectangle extracting means or the figure/table rectangle judging means as figure areas, and classifying areas of the circumscribed table-rectangles extracted in the figure/table rectangle judging means as table areas; and recognition processing means for performing a rule recognition process for each of the binary-valued images which are produced in the image receiving means and are placed in the rule areas classified in the area classifying means, a character recognition process for each of the binary-valued images which are produced in the image receiving means and are placed in the character areas classified in the area classifying means, a figure recognition process for each of the binary-valued images which are produced in the image receiving means and are placed in the figure areas classified in the area classifying means, and a table recognition process for each of the binary-valued images which are produced in the image receiving means and are placed in the table areas classified in the area classifying means.

In the above configuration, one or more tables, one or more figures, one or more rules and one or more characters drawn in a recognized document are read by the image receiving means, and a plurality of rectangles respectively circumscribed about the group of black pixels designating the binary-valued image of the table, the figure, the rule or the character are detected as a plurality of circumscribed rectangles in the circumscribed rectangle detecting means.

Thereafter, one or more circumscribed rectangles circumscribed about the rules are extracted as one or more circumscribed rule-rectangles in the circumscribed rule-rectangle extracting means because a length ratio of a lateral side to a longitudinal side in each of the circumscribed rule-rectangles is higher than a prescribed value.

Thereafter, one or more circumscribed rectangles which are not extracted and are circumscribed about the characters are extracted as one or more circumscribed character-rectangles in the circumscribed character-rectangle extracting means because a shorter length between lengths of lateral and longitudinal sides in each of the circumscribed character-rectangles is lower than a prescribed value.

Thereafter, one or more circumscribed rectangles which are not extracted and are circumscribed about the figures are extracted as one or more circumscribed figure-rectangles in the circumscribed figure-rectangle extracting means because a maximum value among intersection numbers which each correspond to the number of intersections formed on each of the lateral and longitudinal lines is not higher than a prescribed intersection value or a higher value between the number of lateral lines and the number of longitudinal lines is not higher than the prescribed line value.

Thereafter, one or more circumscribed rectangles which are not extracted and are circumscribed about the figures are extracted as one or more additional circumscribed figure-rectangles in the figure/table rectangle judging means because a ratio of the number $N_{P1}$ of black pixels composing the lateral lines and the longitudinal lines to the number $N_{P2}$ of black pixels which are placed in the inside area of each of the additional circumscribed figure-rectangles and are adjacent to each other in the lateral direction, the longitudinal direction or a diagonal direction of the recognized document is not higher than a prescribed value. Also, one or more circumscribed rectangles which are not extracted and are circumscribed about the tables are extracted as one or more circumscribed table-rectangles in the figure/table rectangle judging means because the ratio of the number $N_{P1}$ to the number $N_{P2}$ is higher than the prescribed value.

Thereafter, each of areas of the circumscribed rule-rectangles, the circumscribed character-rectangles, the circumscribed figure-rectangles and the circumscribed table-rectangles are classified as a rule area, a character area, a figure area or a table area in the area classifying means for classifying areas.

Thereafter, rule recognition processes are performed for the binary-valued images placed in the rule areas, character recognition processes are performed for the binary-valued images placed in the character areas, figure recognition processes are performed for the binary-valued images placed in the figure areas, and table recognition processes are performed for the binary-valued images placed in the table areas.

Accordingly, even though a figure composed of many lateral and longitudinal lines is read from the recognized document, the figure can be correctly distinguished from a table.

BRIEF DESCRIPTION OF THE DRAWINGS

The objects, features and advantages of the present invention will be apparent from the following description taken in conjunction with the accompanying drawings, in which:

FIG. 1 is a functional block diagram of a table and figure recognition apparatus according to an embodiment of the present invention;

FIG. 2 is a constitutional block diagram of a table and figure recognition apparatus shown in FIG. 1 according to the embodiment of the present invention;

FIG. 5 shows a figure drawn in a recognized document, a figure attribute being set to a figure-rectangle circumscribed about the figure; and FIG. 6 shows a group of black pixels forming a figure, which is hard in a conventional table and figure recognition method to be distinguished from a table, and a lateral line C1 and four longitudinal lines D1 to D4 extracted from an area of a circumscribed rectangle circumscribed about the figure in a circumscribed figure-rectangle extracting section shown in FIG. 1.

DETAIL DESCRIPTION OF THE PREFERRED EMBODIMENTS

Figure 3A:
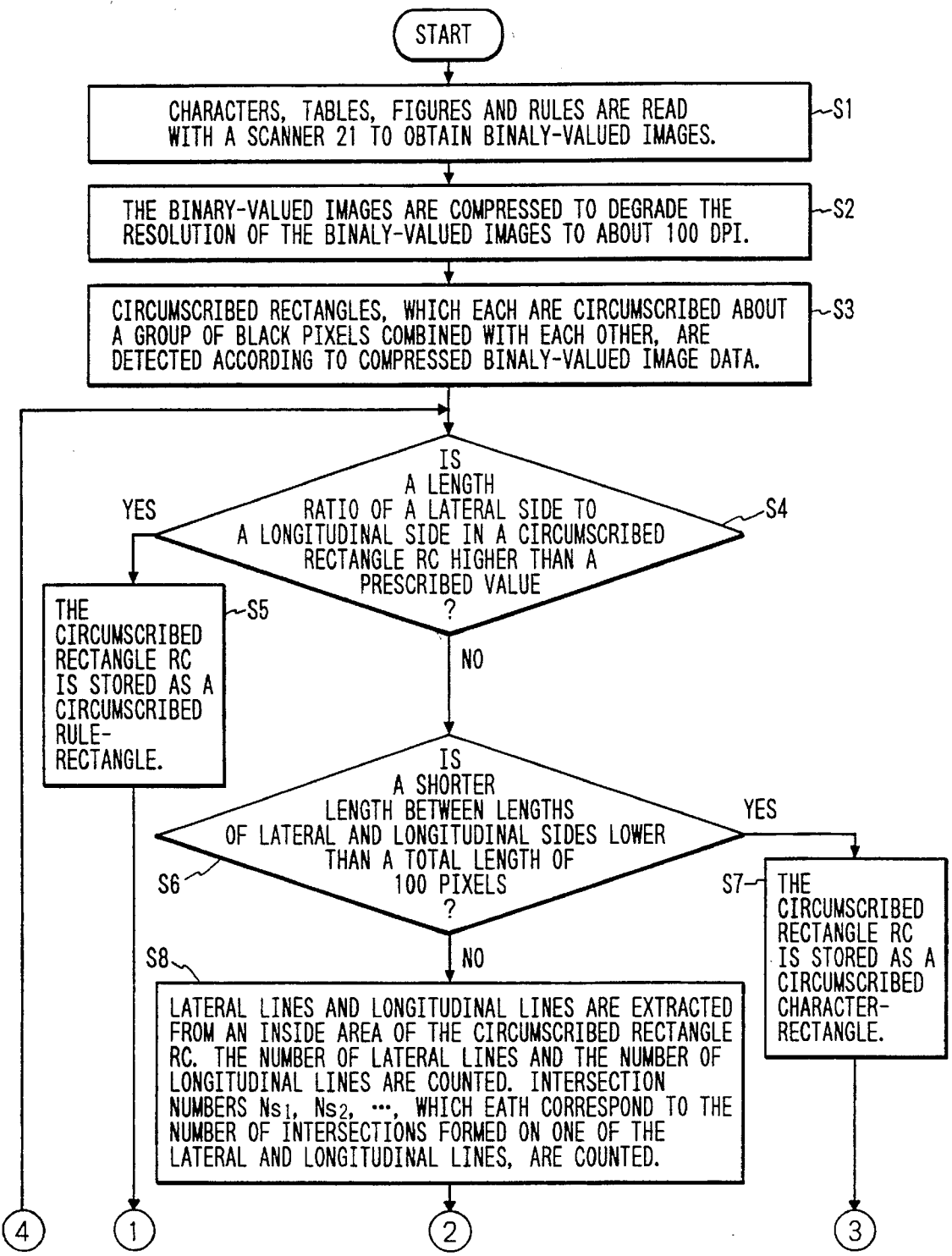
FIGS. 3(a), 3(b) are a flow chart of a table and figure recognition method performed in the apparatus shown in FIG. 1.

Preferred embodiments of a recognition method and a recognition apparatus according to the present invention are described with reference to drawings.

FIG. 1 is a functional block diagram of a table and figure recognition apparatus according to an embodiment of the present invention.

As shown in FIG. 1, a table and figure recognition apparatus 11 comprises an image receiving section 12 for reading characters such as a Chinese character, a letter and the like, tables, figures and rules drawn in a recognized document such as a printed or hand-written document and converting the characters, the tables, the figures and the rules to binary-valued images of the characters, the tables, the figures and the rules, an image compressing section 13 for compressing the binary-valued images output from the image receiving section 12 to produce pieces of compressed binary-valued image data which each denote a black pixel or a white pixel, a circumscribed rectangle detecting section 14 for detecting a plurality of rectangles which each are circumscribed about a group of combined black pixels adjacent to each other in a longitudinal direction, a lateral direction or a diagonal direction as circumscribed rectangles according to the compressed binary-valued image data output from the image compressing section 13, a circumscribed rule-rectangle extracting section 15 for extracting a plurality of circumscribed rule-rectangles from the circumscribed rectangles detected in the circumscribed rectangle detecting section 14 and setting a rule attribute to the circumscribed rule-rectangles, a circumscribed character-rectangle extracting section 16 for extracting a plurality of circumscribed character-rectangles from remaining circumscribed rectangles not extracted in the circumscribed rule-rectangle extracting section 15 and setting a character attribute to the circumscribed character-rectangles, a character line extracting section 17 for detecting combined directions of the circumscribed character-rectangles extracted in the circumscribed character-rectangle extracting section 16 and extracting character-line rectangles respectively composed of the circumscribed character-rectangles combined in the same combined direction, a circumscribed figure-rectangle extracting section 18 for extracting a plurality of circumscribed figure-rectangles from remaining circumscribed rectangles not extracted in the circumscribed character-rectangle extracting section 16 or the circumscribed rule-rectangle extracting section 15 and setting a figure attribute to the circumscribed figure-rectangles, a figure/table rectangle judging section 19 for judging whether each of remaining circumscribed rectangles not extracted in the circumscribed figure-rectangle extracting section 18, the circumscribed character-rectangle extracting section 16 or the circumscribed rule-rectangle extracting section 15 is circumscribed about a figure or a table, extracting additional circumscribed figure-rectangles and a plurality of circumscribed table-rectangles, setting a table attribute to the circumscribed table-rectangles, and setting the figure attribute to the circumscribed figure-rectangles additionally extracted, an included character line inspecting section 20 for inspecting whether or not one or more character-line rectangles extracted in the character line extracting section 17 are included in the circumscribed table-rectangles extracted in the figure/table rectangle judging section 19 and deleting one or more character-line rectangles included in the circumscribed table-rectangles, an area classifying section 21 for classifying areas of the circumscribed rule-rectangles extracted in the circumscribed rule-rectangle extracting section 15 as rule areas according to the rule attributes set to the circumscribed rule-rectangles, classifying areas of the circumscribed character-rectangles extracted in the circumscribed character-rectangle extracting section 16 as character areas according to the character attributes set to the circumscribed character-rectangles, classifying areas of the circumscribed figure-rectangles extracted in the circumscribed figure-rectangle extracting section 18 or the figure/table rectangle judging section 19 as figure areas according to the figure attributes set to the circumscribed figure-rectangles, and classifying areas of the circumscribed table-rectangles extracted in the figure/table rectangle judging section 19 as table areas according to the table attributes set to the circumscribed table-rectangles, and a recognition processing section 22 for performing various recognition processes for the binary-valued images which are output from the image receiving section 12 and are placed in the areas classified in the area classifying section 21 according to the attributes set to the circumscribed rectangles.

In the circumscribed rule-rectangle extracting section 15, a length ratio of a lateral side to a longitudinal side in each of the circumscribed rectangles is calculated, and a plurality of circumscribed rectangles in which the length ratios are respectively higher than a prescribed value of 25/1 are selected as the circumscribed rule-rectangles.

In the circumscribed character-rectangle extracting section 16, a length of a longitudinal side and another length of a lateral side in each of the remaining circumscribed rectangles are compared with each other to select a shorter length between the lengths, and one or more circumscribed rectangles in which the shorter lengths are respectively lower than a prescribed value equivalent to a total length of 100 pixels are selected as the circumscribed character-rectangles.

In the circumscribed figure-rectangle extracting section 18, one or more lateral lines respectively composed of a series of combined black pixels adjacent to each other in a lateral direction and one or more longitudinal lines respectively composed of a series of combined black pixels adjacent to each other in a longitudinal direction are extracted from an inside area of each of the remaining circumscribed rectangles, and the number of lateral lines, the number of longitudinal lines, the number of intersections formed on each of the lateral and longitudinal lines are counted for each of the remaining circumscribed rectangles. Each of the circumscribed figure-rectangles is extracted from the remaining circumscribed rectangles by considering a higher value between the number of lateral lines and the number of longitudinal lines and a maximum value among intersection numbers which each correspond to the number of intersections formed on one of the lateral and longitudinal lines.

In the figure/table rectangle judging section 19, the number $N_{P1}$ of combined black pixels composing the lateral lines and the longitudinal lines extracted in the circumscribed figure-rectangle extracting section 18 is calculated for each of the remaining circumscribed rectangles. Also, the number $N_{P2}$ of combined black pixels which exist in an inside area of each of the remaining circumscribed rectangles and are adjacent to each other in a longitudinal direction, a lateral direction or a diagonal direction is calculated. The judgement whether each of the remaining circumscribed rectangles is a circumscribed figure-rectangle or a circumscribed table-rectangle is performed according to a ratio of the number $N_{P1}$ to the number $N_{P2}$.

FIG. 2 is a constitutional block diagram of the table and figure recognition apparatus shown in FIG. 1 according to the embodiment of the present invention.

As shown in FIG. 2, the table and figure recognition apparatus 11 comprises a scanner 21 functioning as the image receiving section 12 for reading the characters, the tables, the figures and the rules drawn in the recognized document to obtain the binary-valued images, a central processing unit (CPU) 22 for controlling the procedure of a table and figure recognition method performed in the sections 12 to 22 of the table and figure recognition apparatus 11, a read only memory (ROM) 23 for storing various types of control programs in which various instructions utilized in the CPU 22 are drawn, a keyboard 24 for inputting an instruction to start on performing the table and figure recognition method, an image region 25 of a random access memory (RAM) 26 for storing the compressed binary-valued image data produced from the binary-valued images under control of the CPU 22, a rectangle region 27 of the RAM 26 for storing pieces of positional information and size information of the circumscribed rectangles detected in the circumscribed rectangle detecting section 14, a line pixel region 28 of the RAM 26 for storing the number $N_{P1}$ of combined black pixels calculated in the figure/table rectangle judging section 19, a circumscribed pixel region 29 of the RAM 26 for storing the number $N_{P2}$ of combined black pixels calculated in the figure/table rectangle judging section 19, a displaying unit 30 for displaying results obtained by performing various recognition processes in the recognition processing section 22, and a bus 31 for transferring various pieces of data and instructions among the scanner 21, the CPU 22, the ROM 23, the keyboard 24, the RAM 26 and the displaying unit 30.

In the above configuration of the table and figure recognition apparatus 11 shown in FIGS. 1, 2, a table and figure recognition method performed in the apparatus 11 is described with reference to FIGS. 3 to 6.

Figure 3B:
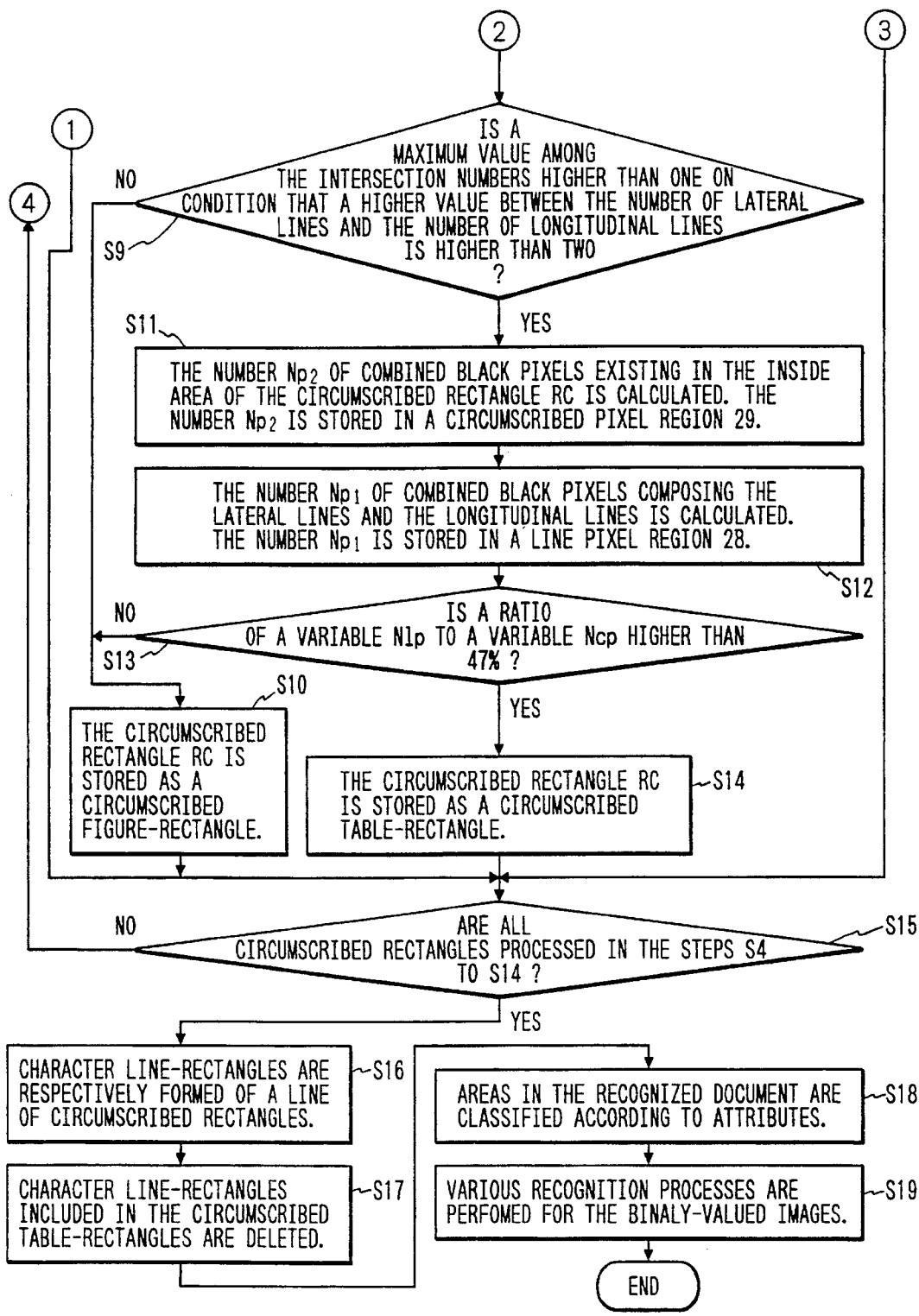
Figures 4A, 4B:
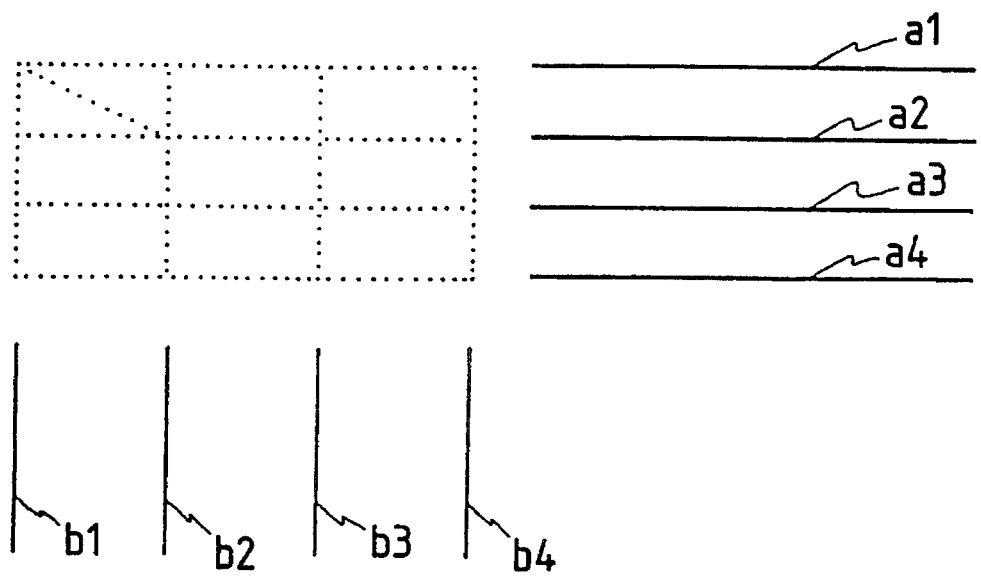
FIG. 4A shows a table with a plurality of letters.
FIG. 4B shows a group of black pixels designating lateral and longitudinal rules of the table shown in FIG. 4A in a circumscribed table-rectangle and four lateral lines A1 to A4 and four longitudinal lines B1 to B4 extracted from an area of the circumscribed table-rectangle in a circumscribed figure-rectangle extracting section shown in FIG. 1.

FIGS. 3(a), 3(b) are a flow chart of a table and figure recognition method performed in the apparatus shown in FIG. 1. FIG. 4A shows a table with a plurality of letters. FIG. 4B shows a group of combined black pixels designating lateral, longitudinal and diagonal rules of the table shown in FIG. 4A in a circumscribed table-rectangle and four lateral lines A1 to A4 and four longitudinal lines B1 to B4 extracted from an area of the circumscribed table-rectangle in the circumscribed figure-rectangle extracting section 18 shown in FIG. 1. FIG. 5 shows a figure drawn in a recognized document, a figure attribute being set to a figure-rectangle circumscribed about the figure. FIG. 6 shows a group of combined black pixels forming a figure, which is hard in a conventional table and figure recognition method to be distinguished from a table, and a lateral line C1 and four longitudinal lines D1 to D4 extracted from an area of a circumscribed rectangle circumscribed about the figure in the circumscribed figure-rectangle extracting section 18 shown in FIG. 1.

As shown in FIG. 3, characters, tables, figures and rules drawn in a recognized document are read with the scanner 21 functioning as the image receiving section 12, and a plurality of binary-valued images respectively corresponding to a character, a table, a figure or a rule drawn in the recognized document are obtained in a step S1. Thereafter, in a step S2, each of the binary-valued images is compressed to degrade the resolution of the binary-valued images to about a 100 dots per inch (dpi), and pieces of compressed binary-valued image data relating to a group of black pixels are produced from each of the binary-valued images compressed and are stored in the image region 25 of the RAM 26. Therefore, a processing rate for the binary-valued images is improved by utilizing the compressed binary-valued image data in place of the binary-valued images.

Thereafter, in a step S3, a plurality of black pixel portions which each are composed of a group of black pixels combined with each other are detected according to the compressed binary-valued image data. The combined black pixels in each of the black pixel portions are adjacent to each other in a longitudinal direction, a lateral direction or a diagonal direction of the recognized document. Also, a plurality of rectangles which each are circumscribed about one of the black pixel portions are determined in the circumscribed rectangle detecting section 14, and the rectangles are called circumscribed rectangles. Pieces of positional information and size information of the circumscribed rectangles are stored in the rectangle region 27 of the RAM 26.

Thereafter, in a step S4, a length ratio of a lateral side to a longitudinal side in each of the circumscribed rectangles is calculated, and it is judged whether or not the length ratio is higher than a prescribed value of 25/1. In cases where the length ratio in a circumscribed rectangle RC is higher than the prescribed value, it is regarded that the circumscribed rectangle RC is circumscribed about a black pixel portion denoting a rule drawn in the recognized document. Therefore, it is judged that the circumscribed rectangle RC is a circumscribed rule-rectangle in the circumscribed rule-rect-angle extracting section 15, and a rule attribute is set to the circumscribed rule-rectangle. Thereafter, the circumscribed rectangle RC with the rule attribute is stored in the rectangle region 27 of the RAM 26 as the circumscribed rule-rectangle in a step S5, and the procedure jumps to a step S15. In contrast, in cases where a length ratio in the circumscribed rectangle RC is not higher than the prescribed value, the procedure proceeds to a step S6.

In the step S6, a length of a longitudinal side in the circumscribed rectangle RC is compared with another length of a lateral side in the circumscribed rectangle RC to select a shorter length between the lengths. Thereafter, it is judged whether or not the shorter length is lower than a prescribed value equivalent to a total length of 100 pixels. In cases where the shorter length is lower than the prescribed value, it is regarded that the circumscribed rectangle RC is circumscribed about a black pixel portion denoting a character drawn in the recognized document. Therefore, it is judged that the circumscribed rectangle RC is a circumscribed character-rectangle in the circumscribed character-rectangle extracting section 16, and a character attribute is set to the circumscribed character-rectangle. Thereafter, the circumscribed rectangle RC with the character attribute is stored in the rectangle region 27 of the RAM 26 as the circumscribed character-rectangle in a step S7, and the procedure jumps to the step S15. In contrast, in cases where the shorter length is not lower than the prescribed value, the procedure proceeds to a step S8.

In the step S8, one or more lateral lines respectively composed of a series of combined black pixels adjacent to each other in a lateral direction and one or more longitudinal lines respectively composed of a series of combined black pixels adjacent to each other in a longitudinal direction are extracted from an inside area of the circumscribed rectangle RC. Thereafter, the number of lateral lines, the number of longitudinal lines, and intersection numbers $N_{S1}$, $N_{S2}$,— each correspond to the number of intersections formed on one of the lateral and longitudinal lines are counted.

In cases where the circumscribed rectangle RC is circumscribed about a table, for example, shown in FIG. 4A, the rules of the table are designated by a group of combined black pixels adjacent to each other, as shown in FIG. 4B, and a plurality of letters included in the circumscribed rectangle RC are designated by other groups of combined black pixels which are separated from the group of combined black pixels designating the rules of the table. In this case, as shown in FIG. 4B, four lateral lines A1 to A4 and four longitudinal lines B1 to B4 are detected, and the number of intersections of each lateral line and the longitudinal lines sums up to four, and the number of intersections of the lateral lines and each longitudinal line sums up to four. In contrast, in cases where the circumscribed rectangle RC is circumscribed about a figure, the figure is, for example, illustrated in FIG. 5. In this case, any lateral line or any longitudinal line is not detected, so that there is no intersection.

Therefore, in a step S9, it is judged whether or not a maximum value among the intersection numbers $N_{S1}$, $N_{S2}$, — is higher than a prescribed intersection value of 1 on condition that a higher value between the number of lateral lines and the number of longitudinal lines is higher than a prescribed line value of 2. In cases where it is judged that the maximum value is not higher than the prescribed intersection value or the higher value is not higher than the prescribed line value, it is judged in the circumscribed figure-rectangle extracting section 18 that the circumscribed rectangle RC is a circumscribed figure-rectangle because the circumscribed rectangle RC is circumscribed about a figure drawn in the recognized document represented by the figure illustrated in FIG. 5, and a figure attribute is set to the circumscribed figure-rectangle. Thereafter, the circumscribed rectangle RC with the figure attribute is stored in the rectangle region 27 of the RAM 26 as the circumscribed figure-rectangle in a step S10, and the procedure jumps to the step S15. In contrast, in cases where it is judged that the maximum value is higher than the prescribed intersection value on condition that the higher value is higher than the prescribed line value, there is a probability that the circumscribed rectangle RC is circumscribed about a table drawn in the recognized document represented by the table illustrated in FIG. 4B, and the procedure proceeds a step S11. The reason that a conclusion that the circumscribed rectangle RC is circumscribed about a table is not made is as follows.

In cases where the circumscribed rectangle RC is circumscribed about a figure indicated by a group of combined black pixels shown in FIG. 6, one lateral line C1 and four longitudinal lines D1 to D4 are detected in the step S9, and the number of intersections of the lateral line C1 and the longitudinal lines D1 to D4 sums up to 4. Therefore, even though it is judged that the maximum value is higher than the prescribed intersection value on condition that the higher value is higher than the prescribed line value, there is the other probability that the circumscribed rectangle RC is circumscribed about a figure drawn in the recognized document. In a conventional table and figure recognition method, the figure indicated by a group of combined black pixels shown in FIG. 6 is erroneously judged a table.

In the step S11, the number $N_{P2}$ of combined black pixels which exist in the inside area of the circumscribed rectangle RC and are adjacent to each other in a longitudinal direction, a lateral direction or a diagonal direction is calculated, and the number $N_{P2}$ is substituted into a variable Ncp. The variable Ncp is stored in the circumscribed pixel region 29 of the RAM 26. In cases where the circumscribed rectangle RC is circumscribed about a table, a group of combined black pixels designating the rules of the table shown in FIG. 4B is, for example, equivalent to the combined black pixels of which the number $N_{P2}$ is calculated in the step S11. In this case, even though one or more characters are drawn in the table, the characters are not detected because black pixels designating the characters are not adjacent to the combined black pixels designating the rules of the table. Also, in cases where the circumscribed rectangle RC is circumscribed about a figure, a group of combined black pixels shown in FIG. 6 is, for example, equivalent to the combined black pixels of which the number $N_{P2}$ is calculated in the step S11. Thereafter, the procedure proceeds to a step S12.

In the step S12, the number $N_{P1}$ of combined black pixels composing the lateral lines and the longitudinal lines extracted in the step S8 is calculated, and the number $N_{P1}$ is substituted into a variable Nlp. The variable Nlp is stored in the line pixel region 28 of the RAM 26. In cases where the circumscribed rectangle RC is circumscribed about a table, as shown in FIG. 4B, almost of the rules forming the table agree with the lateral lines and the longitudinal lines extracted in tile step S8. Therefore, the variable Nip almost agrees with the variable Ncp. In contrast, in cases where the circumscribed rectangle RC is circumscribed about the figure shown in FIG. 6, a part of combined black pixels forming the lateral lines C1 and the longitudinal lines D1 to D4 are detected to calculate the number $N_{P1}$. Therefore, the variable Nlp is considerably lower than the variable Ncp.

Thereafter, in a step S13, a ratio of the variable Nlp to the variable Ncp is calculated in the figure/table rectangle judging section 19, and it is judged whether or not the ratio is higher than a prescribed value of 47%. In cases where it is judged that the ratio is not higher than the prescribed value, it is judged in the figure/table rectangle judging section 19 that the circumscribed rectangle RC is a circumscribed figure-rectangle because the variable Nlp is considerably lower than the variable Ncp in cases where the circumscribed rectangle RC is circumscribed about the figure shown in FIG. 6 as an example, and a figure attribute is set to the circumscribed figure-rectangle. Thereafter, the circumscribed rectangle RC with the figure attribute is stored in the rectangle region 27 of the RAM 26 as the circumscribed figure-rectangle in the step S10, and the procedure jumps to the step S15. In contrast, in cases where it is judged that the ratio is higher than the prescribed value, it is judged in the figure/table rectangle judging section 19 that the circumscribed rectangle RC is a circumscribed table-rectangle because the variable Nlp almost agrees with the variable Ncp in cases where the circumscribed rectangle RC is circumscribed about the table shown in FIG. 4B as an example, and a table attribute is set to the circumscribed table-rectangle. Thereafter, the circumscribed rectangle RC with the table attribute is stored in the rectangle region 27 of the RAM 26 as the circumscribed table-rectangle in a step S14, and the procedure proceeds to the step S15.

Accordingly, even though a figure which is hard to be distinguished from a table in a conventional table and figure recognition method is drawn in the recognized document, the figure can be correctly distinguished from a table without any erroneous judgement.

In the step S15, it is judged whether or not all of the circumscribed rectangles determined in the step S3 are respectively processed as the circumscribed rectangle RC in the steps S4 to S14. In cases where one or more circumscribed rectangles are not processed, the procedure returns to the step S4, and the procedure in the steps S4 to S14 is repeated. Therefore, a large number of circumscribed character-rectangles are stored in the step S7. Also, in cases where all of the circumscribed rectangles are processed, the procedure proceeds to a step S16.

In the step S16, combined directions of the circumscribed character-rectangles stored in the step S7 are detected, and one or more character-line rectangles are formed of the circumscribed character-rectangles in the character line extracting section 17. Each of the character-line rectangles is composed of the circumscribed character-rectangles which are combined with each other and are arranged in the same combined direction.

In a step S17, it is inspected whether or not one or more character-line rectangles extracted in the step 16 are included in the circumscribed table-rectangles stored in the step S14, and the character-line rectangles included in the circumscribed table-rectangles are deleted in the included character line inspecting section 20.

In a step 18, various types of areas in the recognized document are classified in the area classifying section 21 according to the attributes. In detail, areas of the circumscribed rule-rectangles stored in the step S5 are classified as rule areas according to the rule attributes set to the circumscribed rule-rectangles, areas of the circumscribed character-rectangles which are stored in the step S7 and are not deleted in the step S17 are classified as character areas according to the character attributes set to the circumscribed character-rectangles, areas of the circumscribed figure-rectangles stored in the step S10 are classified as figure areas according to the figure attributes set to the circumscribed figure-rectangles, and areas of the circumscribed table-rectangles stored in the step S14 are classified as table areas according to the table attributes set to the circumscribed table-rectangles.

In a step S19, various recognition processes are performed in the recognition processing section 22. In detail, rule recognition processes are performed for the binary-valued images which are output from the image receiving section 12 and are placed in the rule areas classified in the area classifying section 21 according to the rule attribute set to the circumscribed rule-rectangles, character recognition processes are performed for the binary-valued images which are output from the image receiving section 12 and are placed in the character areas classified in the area classifying section 21 according to the character attribute set to the circumscribed character-rectangles, figure recognition processes are performed for the binary-valued images which are output from the image receiving section 12 and are placed in the figure areas classified in the area classifying section 21 according to the figure attribute set to the circumscribed figure-rectangles, table recognition processes are performed for the binary-valued images which are output from the image receiving section 12 and are placed in the table areas classified in the area classifying section 21 according to the table attribute set to the circumscribed table-rectangles.

Accordingly, even though a figure having many lateral or longitudinal lines and many intersections of the lateral and longitudinal lines is drawn in the recognized document, the figure can be correctly distinguished from a table.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A table and figure recognition method, comprising the steps of:

reading image information from a document, the image information denoting a table or a figure;

producing binary data from the image information, the binary data being formed of a group of black pixels;

detecting a rectangle circumscribed about the group of black pixels designating the binary data as a circumscribed rectangle;

extracting one or more lateral lines respectively composed of a plurality of black pixels which are placed in an inside area of the circumscribed rectangle and are adjacent to each other in a lateral direction of the document;

extracting one or more longitudinal lines respectively composed of a plurality of black pixels which are placed in the inside area of the circumscribed rectangle and are adjacent to each other in a longitudinal direction of the document;

counting the number $N_{P1}$ of black pixels composing the lateral lines and the longitudinal lines extracted;

counting the number $N_{P2}$ of black pixels which are placed in the inside area of the circumscribed rectangle and are adjacent to each other in the lateral direction, the longitudinal direction or a diagonal direction of the document;

calculating a ratio of the number $N_{P1}$ to the number $N_{P2}$;

recognizing the image information read from the document as a table in cases where the ratio calculated is higher than a prescribed value; and recognizing the image information read from the document as a figure in cases where the ratio calculated is not higher than the prescribed value.

2. A recognition method according to claim 1 in which the step of producing binary data includes:

compressing the binary data to produce pieces of compressed binary data denoting the group of black pixels.

3. A recognition method according to claim 1, additionally including:

reading a plurality of characters drawn in the document, the characters being placed in a line;

producing binary-valued images of the characters, each of the binary-valued images being formed of a group of black pixels;

detecting a plurality of rectangles respectively circumscribed about the group of black pixels designating one of the characters as circumscribed character-rectangles;

extracting a character-line rectangle formed by combining the circumscribed character-rectangles in a line;

inspecting whether or not the character-line rectangle is included in the table which is recognized in the step of recognizing the image information read from the document as a table; and deleting the character-line rectangle in cases where the character-line rectangle is included in the table.

4. A recognition method according to claim 1, additionally including:

calculating a maximum value among intersection numbers which each correspond to the number of intersections formed on each of the lateral and longitudinal lines extracted judging whether or not the maximum value is higher than a prescribed intersection value on condition that a higher value between the number of lateral lines extracted and the number of longitudinal lines extracted is higher than a prescribed line value;

recognizing the image information read from the document as the figure prior to the steps of recognizing the image information according to the ratio in cases where the maximum value is not higher than the prescribed intersection value or the higher value is not higher than the prescribed line value.

5. A table and figure recognition apparatus, comprising:

image receiving means for reading a piece of image information from a document to produce pieces of binary data from the image information, the binary data being formed of a group of black pixels;

circumscribed rectangle detecting means for detecting a rectangle circumscribed about the group of black pixels designating the binary data read by the image receiving means as a circumscribed rectangle;

lateral and longitudinal line extracting means for extracting one or more lateral lines respectively composed of a plurality of black pixels which are placed in an inside area of the circumscribed rectangle detected by the circumscribed rectangle detecting means and are adjacent to each other in a lateral direction of the document and extracting one or more longitudinal lines respectively composed of a plurality of black pixels which are placed in the inside area of the circumscribed rectangle detected by the circumscribed rectangle detecting means and are adjacent to each other in a longitudinal direction of the document; and figure/table rectangle judging means for counting the number $N_{P1}$ of black pixels composing the lateral lines and the longitudinal lines extracted by the lateral and longitudinal line extracting means, counting the number $N_{P2}$ of black pixels which are placed in the inside area of the circumscribed rectangle detected by the circumscribed rectangle detecting means and are adjacent to each other in the lateral direction, the longitudinal direction or a diagonal direction of the document, calculating a ratio of the number $N_{P1}$ to the number $N_{P2}$, recognizing the image information from the document as table in cases where the ratio is higher than a prescribed value, and recognizing image information from the document as a figure in cases where the ratio is not higher than the prescribed value.

6. A recognition apparatus according to claim 5, additionally including:

image compressing means for compressing the pieces of binary data produced in the image receiving means to produce pieces of compressed binary data denoting the group of black pixels, the rectangle circumscribed about the group of black pixels being detected in the circumscribed rectangle detecting means according to the compressed binary data.

7. A recognition apparatus according to claim 5 in which a line of characters drawn in the document are detected in the image receiving means to produce binary-valued images of the characters, each of the binary-valued images is formed of a group of black pixels, and a plurality of rectangles respectively circumscribed about the group of black pixels designating one of the characters are detected as a plurality of circumscribed rectangles in the circumscribed rectangle detecting means, and additionally includes:

circumscribed character-rectangle extracting means for extracting a part of the circumscribed rectangles detected in the circumscribed rectangle detecting means as a plurality of circumscribed character-rectangles, each of the circumscribed character-rectangles being circumscribed about a group of black pixels designating one of characters, and the circumscribed character-rectangles being adjacent to each other in a line;

character line extracting means for extracting a character-line rectangle formed by combining the circumscribed character-rectangles extracted in the circumscribed character-rectangle extracting means; and included character line inspecting means for inspecting whether or not the character-line rectangle extracted in the character line extracting means is included in the table recognized in the figure/table rectangle judging means and deleting the character-line rectangle in cases where the character-line rectangle is included in the table.

8. A recognition apparatus according to claim 7 in which a shorter length between lengths of lateral and longitudinal sides in each of the part of the circumscribed rectangles extracted as the circumscribed character-rectangles in the circumscribed character-rectangle extracting means is lower than a prescribed value.

9. A recognition apparatus according to claim 5, additionally including:

circumscribed figure-rectangle extracting means for calculating a maximum value among intersection numbers which each correspond to the number of intersections formed on each of the lateral and longitudinal lines extracted in the lateral and longitudinal line extracting means, judging whether or not the maximum value is higher than a prescribed intersection value on condition that a higher value between the number of lateral lines and the number of longitudinal lines is higher than a prescribed line value, and recognizing the table or the figure drawn in the document as the figure in cases where the maximum value is not higher than the prescribed intersection value or the higher value is not higher than the prescribed line value, the table or the figure drawn in the document being recognized in the figure/table rectangle judging means in cases where the maximum value is higher than the prescribed intersection value on condition that the higher value is higher than the prescribed line value.

10. A table and figure recognition apparatus, comprising:

image receiving means for reading one or more tables, one or more figures, one or more rules and one or more characters drawn in a document to produce a plurality of binary-valued images of the tables, the figures, the rules and the characters, each of the binary-valued images being formed of a group of black pixels;

circumscribed rectangle detecting means for detecting a plurality of rectangles respectively circumscribed about the group of black pixels designating the binary-valued image of the table, the figure, the rule or the character read by the image receiving means as a plurality of circumscribed rectangles;

circumscribed rule-rectangle extracting means for calculating a length ratio of a lateral side to a longitudinal side in each of the circumscribed rectangles detected in the circumscribed rectangle detecting means and extracting one or more circumscribed rectangle in which the length ratios are higher than a prescribed value as one or more circumscribed rule-rectangle from the circumscribed rectangles;

circumscribed character-rectangle extracting means for calculating a shorter length between lengths of lateral and longitudinal sides in each of remaining circumscribed rectangles not extracted in the circumscribed rule-rectangle extracting means and extracting one or more circumscribed rectangles in which the shorter lengths are lower than a prescribed value as one or more circumscribed character-rectangles from the remaining circumscribed rectangles;

circumscribed figure-rectangle extracting means for extracting one or more lateral lines respectively composed of a plurality of black pixels which are placed in an inside area of each of remaining circumscribed rectangles not extracted in the circumscribed character-rectangle extracting means or the circumscribed rule-rectangle extracting means and are adjacent to each other in a lateral direction of the document, extracting one or more longitudinal lines respectively composed of a plurality of black pixels which are placed in the inside area of each of the remaining circumscribed rectangle and are adjacent to each other in a longitudinal direction of the document, calculating a maximum value among intersection numbers which each correspond to the number of intersections formed on each of the lateral and longitudinal lines, judging whether or not the maximum value is higher than a prescribed intersection value on condition that a higher value between the number of lateral lines and the number of longitudinal lines is higher than a prescribed line value, and recognizing the table or the figure drawn in the document as the figure in cases where the maximum value is not higher than the prescribed intersection value or the higher value is not higher than the prescribed line value;

figure/table rectangle judging means for counting the number $N_{P1}$ of black pixels composing the lateral lines and the longitudinal lines extracted in the circumscribed figure-rectangle extracting means for each of remaining circumscribed rectangles not extracted in the circumscribed figure-rectangle extracting means, the circumscribed character-rectangle extracting means or the circumscribed rule-rectangle extracting means, counting the number $N_{P2}$ of black pixels which are placed in the inside area of each of the remaining circumscribed rectangles and are adjacent to each other in the lateral direction, the longitudinal direction or a diagonal direction of the document, calculating a ratio of the number $N_{P1}$ to the number $N_{P2}$, recognizing the table or the figure drawn in the document as a table in cases where the ratio is higher than a prescribed value, and recognizing the table or the figure drawn in the document as a figure in cases where the ratio is not higher than the prescribed value;

area classifying means for classifying areas of the circumscribed rule-rectangles extracted in the circumscribed ruler-rectangle extracting means as rule areas, classifying areas of the circumscribed character-rectangles extracted in the circumscribed character-rectangle extracting means as character areas, classifying areas of the circumscribed figure-rectangles extracted in the circumscribed figure-rectangle extracting means or the figure/table rectangle judging means as figure areas, and classifying areas of the circumscribed table-rectangles extracted in the figure/table rectangle judging means as table areas; and recognition processing means for performing a rule recognition process for each of the binary-valued images which are produced in the image receiving means and are placed in the rule areas classified in the area classifying means, a character recognition process for each of the binary-valued images which are produced in the image receiving means and are placed in the character areas classified in the area classifying means, a figure recognition process for each of the binary-valued images which are produced in the image receiving means and are placed in the figure areas classified in the area classifying means, and a table recognition process for each of the binary-valued images which are produced in the image receiving means and are placed in the table areas classified in the area classifying means.

* * * * *